(12) United States Patent
Holtcamp et al.

(10) Patent No.: US 7,648,940 B2
(45) Date of Patent: Jan. 19, 2010

(54) CATALYST SYSTEM FOR OLEFIN POLYMERIZATION AND POLYMERS PRODUCED THEREFROM

(75) Inventors: Matthew W. Holtcamp, Huffman, TX (US); Renuka N. Ganesh, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 81 days.

(21) Appl. No.: 11/589,499

(22) Filed: Oct. 30, 2006

(65) Prior Publication Data

US 2007/0112151 A1    May 17, 2007

Related U.S. Application Data

(60) Provisional application No. 60/737,595, filed on Nov. 17, 2005.

(51) Int. Cl.
*B01J 23/26* (2006.01)
(52) U.S. Cl. ....................... 502/309; 502/319
(58) Field of Classification Search ................ 502/309, 502/319
See application file for complete search history.

(56) References Cited

U.S. PATENT DOCUMENTS

| | | | |
|---|---|---|---|
| 2,825,721 A | | 3/1958 | Hogan et al. |
| 3,709,853 A | | 1/1973 | Karapinka |
| 5,254,517 A | * | 10/1993 | Shamsoum et al. ......... 502/110 |
| 5,723,399 A | | 3/1998 | Takemoto et al. |
| 6,011,127 A | * | 1/2000 | Monoi et al. ............... 526/127 |
| 6,040,399 A | | 3/2000 | Monoi et al. |

FOREIGN PATENT DOCUMENTS

| JP | 1998338707 | 12/1998 |
|---|---|---|
| JP | 1999092522 | 4/1999 |
| JP | 1999228620 | 8/1999 |

OTHER PUBLICATIONS

Barron, Andrew. Organometallics, 1995, 14, pp. 3581-3583.*
Enders et al., "New Chromium(III) Complexes as Highly Active Catalysts for Olefin Polymerization", Organometallics, 2001, 20, pp. 5005-5007.
Theopold, "Homogeneous Chromium Catalysts for Olefin Polymerization", Eur. J. Inorg. Chem., 1998, pp. 15-24.
Japanese Abstract for JP 11092522 (see AF).
Japanese Abstract for JP 11228620 (see AG).
Japanese Abstract for JP 10338707 (see AH).

* cited by examiner

*Primary Examiner*—Rebecca L Anderson
*Assistant Examiner*—Shawquia Young
(74) *Attorney, Agent, or Firm*—Catherine L. Bell

(57) ABSTRACT

This invention relates to a catalyst composition of the formula:

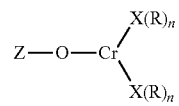

where
Z—O is a support material, where O is oxygen, preferably Z is Si, Ti, Al, Sn, Fe, Ga, Zr, B, Mg, or Cr;
each X is, independently, N, O, P or S;
each n is, independently, 1 or 2;
each R is, independently, an alkyl group, a substituted alkyl group, an aryl group, or a substituted aryl group, provided at least one R group is an aryl or substituted aryl group.

This invention also relates to the use of the above catalyst compound with an aluminum alkyl to polymerize olefins and other monomers.

45 Claims, 1 Drawing Sheet

CATALYST SYSTEM FOR OLEFIN POLYMERIZATION AND POLYMERS PRODUCED THEREFROM

PRIORITY CLAIM

This invention claims priority to and the benefit of U.S. Ser. No. 60/737,595, filed Nov. 17, 2005.

FIELD OF THE INVENTION

This invention relates to a process to polymerize olefins using chromium catalysts, the chromium catalysts, and polymers produced therefrom.

BACKGROUND OF THE INVENTION

Olefin polymerization catalysts are of great use in industry. Hence there is great interest in finding new catalyst compounds, particularly compounds that can be easily supported and or modified by altering the ligands. There also exists the need to reduce catalyst costs by developing catalyst systems that are efficient utilizing simple alkyl aluminums rather than alumoxanes which are traditionally more expensive.

Silica supported chromium tris(amide)/alumoxane olefin polymerization catalysts are found in U.S. Pat. No. 6,040,399 where calcining at greater than 500° C. is disclosed to reduce polyethylene molecular weight (column 4, line 24). Further the U.S. Pat. No. 6,040,399 examples use Cr(III) tris(trimethylsilyamide) which may or may not react with the support and as noted they found only formation of oligomers if using silica calcined above 500 C. Further in U.S. Pat. No. 6,040, 399, comparative example 4, describes a catalyst system with a supported Cr(III) tri(trimethylsilyamide) catalyst activated with triisobutylaluminum yielding an extremely low activity polymerization catalyst.

U.S. Pat. No. 6,011,127 discloses a process for making polyethylene comprising polymerizing ethylene in the presence of a supported catalyst comprising a chromium compound such as a chromium amide, an alumoxane, and an organometallic alkoxide.

U.S. Pat. No. 5,723,399 discloses an ethylenic polymerization catalyst comprising a chromium compound, a carrier, alumoxane, and a transition metal compound having a conjugated π (Pi) electron as a ligand, where in the chromium compound is not calcined.

Additional references that are of interest include: JP-11092522 A2 (199-04-06), JP-11228620 (1999 08-24), JP-10338707 (1998-12-22), Enders, M.; Fernandez, P.; Ludwig, G.; Pritzkow, H. Organometallics 2001, 20, 5005-5007, Theopold, K. H.; Eur. J. Inorg. Chem. 1998, 15., Karapinka., G. L. U.S. Pat. No. 3,709,853; 1973, Hogan, J. P.; and Banks, R. L. U.S. Pat. No. 2,825,721, 1958.

SUMMARY OF THE INVENTION

This invention relates to a supported catalyst composition represented by the formula:

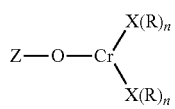

where Cr is preferably in the 3+valence state,

Z-O is a support material, where O is oxygen, preferably Z is Si, Ti, Al, Sn, Fe, Ga, Zr, B, Mg or Cr;

each X is, independently, N, O, P or S;

each n is, independently, 1 or 2;

each R is, independently, an alkyl group, a substituted alkyl group, an aryl group, or a substituted aryl group, provided at least one R group is an aryl or substituted aryl group.

In the formula above the Z is typically present in the form of a support and the chromium is bound to the support via at least one an oxygen atom.

The invention also relates to a polymerization process using the above catalyst compound in combination with one or more aluminum alkyl activators to polymerize olefins.

This invention also relates to a process to polymerize monomers comprising contacting monomers with a composition comprising an aluminum alkyl and a catalyst compound of the formula:

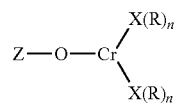

where

Z—O is a support material, where O is oxygen and Z is Si, Ti, Al, Sn, Fe, Ga, Zr, B, Mg or Cr;

each X is, independently, nitrogen, oxygen, phosphorus, or sulfur each n is, independently, 1 or 2;

each R is, independently, a C1 to C30 linear, branched or cyclic alkyl group, a substituted C1 to C30 linear, branched or cyclic alkyl group, an aryl group, or a substituted aryl group, provided at least one R group is an awl or substituted aryl group.

DETAILED DESCRIPTION

Figure 1:
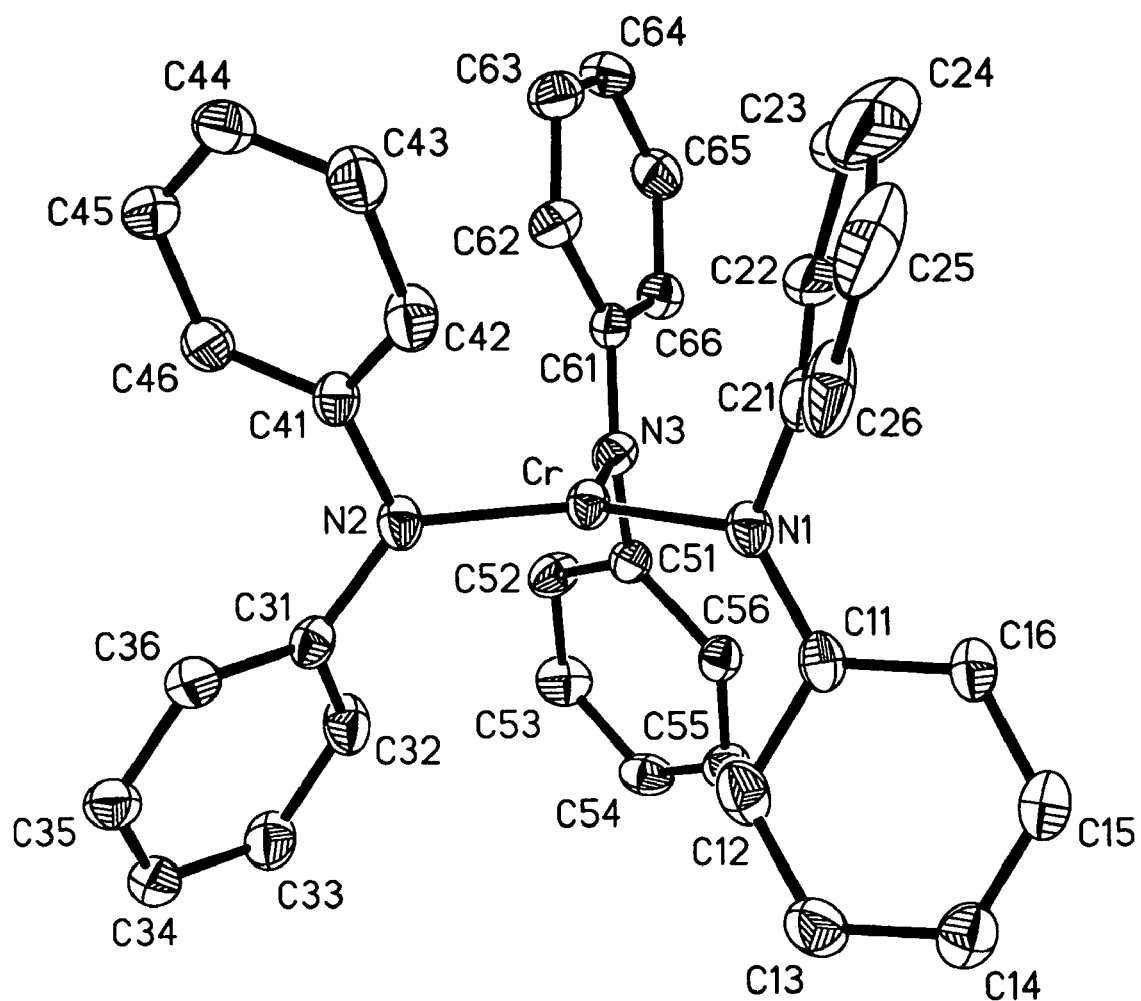
FIG. 1 is a representation of the catalyst compound produced in example 2.

For the purposes of this invention and the claims thereto when a polymer is referred to as comprising an olefin or other monomer, the olefin present in the polymer is the polymerized form of the olefin or other monomer, respectively. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

As used herein, the new numbering scheme for the Periodic Table Groups is used as published in CHEMICAL AND ENGINEERING NEWS, 63(5), 27 (1985).

As used herein the term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), vinyl, n-butyl, t-butyl, i-butyl (or 2-methylpropyl), etc. In particular embodiments, alkyls have between 1 and 200 carbon atoms, between 1 and 50 carbon atoms or between 1 and 20 carbon atoms.

As used herein the term substituted means one or more hydrogen atom to any carbon is replaced by another group such as a halogen, aryl, substituted aryl, cycloalkyl, substituted cycloalkyl, and combinations thereof. Examples of substituted alkyls include wmthylbenzyl, trifluoromethyl and the like.

The term "aryl" is used herein to refer to an aromatic substituent which may be a single aromatic ring or multiple aromatic rings which are fused together, linked, covalently, or linked to a common group such as a methylene or ethylene moiety. The common linking group may also be a carbonyl as in benzophenone or oxygen as in diphenylether. The aromatic ring(s) may include phenyl, naphthyl, biphenyl, diphenylether, tolyl and benzophenone among others. In particular embodiments, aryls have between 6 and 200 carbon atoms, between 6 and 50 carbon atoms or between 6 and 20 carbon atoms. "Substituted aryl" refers to aryl as just described in which one or more hydrogen atom to any carbon is replaced by one or more groups such as alkyl, substituted alkyl, cycloalkyl, substituted cycloalkyl, heterocycloalkyl, substituted heterocycloalkyl, halogen, alkylhalos (e.g., CFA hydroxy, phosphino, alkoxy, aryloxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone.

As used herein the term "silyl" refers to the $SiQ^1Q^2Q^3$ radical, where each of $Q^1$, $Q^2$, and $Q^3$ is independently selected from the group consisting of alkyl, substituted alkyl, cycloalkyl, substituted cycloalkyl, heterocylcoalkyl, substituted heterocycloalkyl, aryl, substituted aryl, heteroaryl, substituted heteroaryl, alkoxy, aryloxy, amino, silyl and combinations thereof.

The term "amino" is used herein to refer to the group $-NQ^1Q^2$, where each of $Q^1$ and $Q^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

This invention relates to new catalyst compounds and to a method to polymerize olefins comprising contacting the new catalyst compound with an alkyl aluminum and a monomer. Preferred alkyl aluminums are represented by the formula: $AlR_3$ where each R is independently a linear cyclic or branched alkyl group. Typically alumoxane is not present in the polymerization, or if it is, the alumoxane is present at 100 ppm or less, preferably 50 ppm or less, preferably 10 ppm or less, preferably 0 ppm. Alternatively the alumoxane is present at less than one equivalent per catalyst atom.

Catalyst Compounds

In the description herein the catalyst compound may be described as a catalyst precursor, a pre-catalyst compound or a transition metal compound, and these terms are used interchangeably. A catalyst system is combination of a catalyst precursor and an activator.

Preferred catalyst compounds useful in this invention include those arylamide Cr(III) species on a support. The amide preferably contains electron withdrawing groups such as phenyl, biphenyl, napthyl, halogenated or partially halogenated aryls, etc.

In another embodiment the catalyst compounds of this invention are represented by the formula:

This invention relates to a catalyst composition represented by the formula:

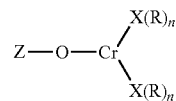

where Cr is preferably in the 3+valence state,

Z—O is a support material, where O is oxygen, preferably Z is one or more of Si, Ti, Al, Sn, Fe, Ga, Zr, B, Mg, and Cr, each X is, independently, N, O, P or S, preferably N, each n is independently 1 or 2, each R is, independently, an alkyl group, a substituted alkyl group, an aryl group, or a substituted aryl group, provided at least one R group is an aryl or substituted aryl group.

In the formula above the Z is typically present in the form of a support and the chromium is bound to the support via at least one an oxygen atom.

In an alternate embodiment, each R is, independently, a substituted or unsubstituted C1 to C30 linear, branched or cyclic alkyl group or a substituted or unsubstituted C6 to C30 aryl group, preferably each R is, independently, at least one R group is an aryl or substituted aryl group, preferably a phenyl (substituted or unsubstituted), naphthyl(substituted or unsubstituted), biphenyl(substituted or unsubstituted), diphenylether(substituted or unsubstituted), tolyl(substituted or unsubstituted) or benzophenone(substituted or unsubstituted), methyl, ethyl, propyl, butyl, isobutyl, hexyl, isohexyl, octyl, cyclohexyl, dodecyl, or a mixture thereof. Preferred aryl or substituted aryl groups are selected from the group consisting of phenyl(substituted or unsubstituted), naphthyl (substituted or unsubstituted), biphenyl(substituted or unsubstituted), diphenylether(substituted or unsubstituted), tolyl (substituted or unsubstituted) or benzophenone(substituted or unsubstituted).

Alternately, each R is, independently, an alkyl group, a substituted alkyl group, an aryl group, or a substituted aryl group, provided at least one R group is an aryl or substituted aryl group.

In a preferred embodiment in the above formula, both X groups are N, n is 2 and each R is selected from the group consisting of phenyl(substituted or unsubstituted), naphthyl (substituted or unsubstituted), biphenyl(substituted or unsubstituted), diphenylether(substituted or unsubstituted), tolyl (substituted or unsubstituted) or benzophenone(substituted or unsubstituted)phenyl, preferably each R group is selected from the group consisting of napthyl, phenyl, biphenyl, fluorophenyl, and tolyl.

In a preferred embodiment in the above formula, one X is N, the other X is O, each n is 2 and each R is selected from the group consisting of phenyl(substituted or unsubstituted), naphthyl(substituted or unsubstituted), biphenyl(substituted or unsubstituted), diphenylether(substituted or unsubstituted), tolyl(substituted or unsubstituted) or benzophenone (substituted or unsubstituted)phenyl, preferably each R group is selected from the group consisting of napthyl, phenyl, biphenyl, fluorophenyl, and tolyl.

In a further embodiment, the supported chromium compound represented by the formula:

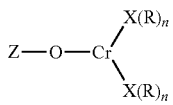

(where Z, X R and n are as defined above), is further reacted with other modifying compounds to replace one or both X(R)n groups. For example the supported chromium compound is reacted with HX'R'n (where X' is N, O, S, or P, R' is the same as R above, and n is 1 or 2. Further, the amide Cr(III) species on the support may be reacted with other heteroatom containing ligands that contain an acidic hydrogen capable of liberating amine from the Cr species. For example, perfluorophenol was reacted with the diphenyl amide Cr(III) silica bound species. Diphenylamine was released into the solvent yielding a Cr perfluorophenoxy species. Thus we have discovered a convenient route to vary the ligands of the chromium site on the support.

Activators and Activation Methods for Catalyst Compounds

The catalyst compounds, described above, are typically activated in various ways to yield compounds having an alkyl group and a vacant coordination site that will coordinate, insert, and polymerize olefin(s) or other monomers. For the purposes of this patent specification and appended claims, the terms "cocatalyst" and "activator" are used herein interchangeably and are defined to be any compound which can activate any one of the catalyst compounds described above by converting the catalyst compound to a catalytically active catalyst compound. Non-limiting activators, for example, include aluminum alkyls.

Aluminum Alkyl Activators

Preferred aluminum alkyl activators are typically those represented by the formula $Al(R'')_3$, where each R'' is, independently, a C1 to C30 alkyl group, preferably C1 to C20 linear or branched alkyl group, more preferably each R'' is selected from the group consisting of methyl, ethyl, propyl, butyl, pentyl, hexyl, octyl, nonyl, decyl, undecyl, dodecyl, (including all isomers thereof, such as isobutyl, isoocty, etc.) particularly preferred aluminum alkyl activators include trimethylaluminum, triethylaluminum, tri-n-butylaluminum, triisobutylaluminum, tri-n-hexylaluminum, tri-n-octylaluminum and the like.

When the activator is an alkyl aluminum some embodiments select the maximum amount of activator at a 5000-fold molar excess Al/Cr over the catalyst compound (per metal catalytic site). The minimum activator-to-catalyst-compound is a 1:1 molar ratio. In general the catalyst compounds and the activators are combined in molar ratios of about 1:10,000 to about 10:1, alternatively from 1:5000 to 10:1, alternatively from 1:1000 to 10:1; alternatively, 1:500 to 2:1; or 1:300 to 1:1. Multiple activators may be used, including using mixes of different aluminum alkyls.

Alternately, Chromium to aluminum ratios are about 1 to 20. Preferred amounts may be anywhere from 1:1 to 1:5,000 depending on reactor, conditions, and desired properties.

Supports

Preferably the catalyst compositions of this invention include a support material or carrier. The support material is any of the conventional support materials. Preferably the supported material is a porous support material, for example, talc, and inorganic oxides. Other support materials include zeolites, clays, organoclays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Particularly useful supports include magnesia, titania, zirconia, montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the carrier useful in the invention typically has pore size in the range of from 10 to 1000 Å, preferably 50 to about 500 Å, and most preferably 75 to about 350 Å.

In another embodiment the support may comprise one or more types of support material which may be treated differently. For example one could use two different silicas that had different pore volumes or had been calcined at different temperatures. Likewise one could use a silica that had been treated with a scavenger or other additive and a silica that had not.

Preferably the supports have been calcined at temperatures above 500° C., preferably above 550° C., preferably at 600° C. or above, preferably above 650° C., preferably at 700° C. or above, preferably above 750° C., preferably at 800° C. or above.

In an alternate embodiment, the supports have been calcined at temperatures above 200° C., preferably above 300° C., preferably at 400° C. or above.

In another embodiment, the supports have not been calcined.

The process of loading the catalyst on the support material involves combining the support and catalyst at elevated temperatures (such as 60° C. or above, or 100° C. or above). The amount of catalyst loaded on the support is based on the amount of reactive moieties on the surface of the support and the desired degree of loading. Catalyst loading may range from no load (no catalyst) to excess (100% loading). The chromium complex is dissolved in a non-donor solvent, such as fluorobenzene, toluene or hexanes, to which the support material is added. This mixture is typically heated at a temperature between 25° C. and 200° C. for 5 hours to 48 hours. On completion of the reaction, the supported catalyst can be separated from any byproducts by filtration and used as is, or reacted further. More specifically the process can involve combining equimolar amounts of the chromium (III) diphenylamide catalyst and silica (previously calcined at 600° C.), in toluene at the elevated temperature of 100° C. overnight. The supported chromium (III) diphenylamide catalyst is then washed with toluene, filtered, and dried for further use or modification. Similar reaction conditions are used when replacing an X(R)n group with an HX'R'n group.

Monomers

The catalyst compounds described herein may be used for the polymerization of one or more of monomers. Typical monomers include monomers having from 2 to 30 carbon atoms, preferably 2-12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Preferred monomers include one or more of ethylene, propylene, butene-1, pentene-1,4-methyl-pentene-1, hexene-1, octene-1, decene-1,3-methyl-pentene-1, norbornene, norbornadiene, vinyl norbornene, ethylidene norbornene monomers.

In a particularly preferred embodiment the process of this invention relates to the homopolymerization of ethylene or the copolymerization of ethylene with at least one comonomer having from 4 to 8 carbon atoms, preferably 4 to 7 carbon atoms. Particularly, the comonomers are butene-1,4-methyl-pentene-1,3-methyl-pentene-1, hexene-1 and octene-1, the most preferred being hexene-1, butene-1 and octene-1.

In another particularly preferred embodiment the polymer produced herein is a propylene homopolymer or copolymer. The comonomer of the copolymer is preferably a C4 to C20 linear, branched or cyclic monomer, and in one embodiment is a C4 to C12 linear or branched alpha-olefin, preferably ethylene, butene, pentene, hexene, heptene, octene, nonene, decene, dodecene, 4-methyl-pentene-1,3-methyl pentene-1, 3,5,5-trimethyl-hexene-1, and the like. In an alternate embodiment, ethylene is present at 5 mol % or less.

In another embodiment the polymer produced herein is a homopolymer or copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment, the monomer to be polymerized comprises aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also useful monomers herein. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

Polymerization Processes

The catalysts and catalyst systems described above are suitable for use in a solution, bulk, gas or slurry polymerization process or a combination thereof, preferably solution phase or bulk phase polymerization process. Preferably the process is a continuous process. By continuous is meant a system that operates (or is intended to operate) without interruption or cessation. For example a continuous process to produce a polymer would be one where the reactants are continually introduced into one or more reactors and polymer product is continually withdrawn.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1,4-methyl-pentene-1, hexene-1, octene-1, decene-1,3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst compound and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst compounds can be added to the first reactor in the series. The catalyst component may also be added to both reactors, with one component being added to first reaction and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Gas Phase Polymerization

Generally, in a fluidized gas bed process useful herein for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

Preferably, the reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process useful in the invention is capable of and the process useful in the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process useful in the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process useful in the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process useful in the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Homogeneous, Bulk, or Solution Phase Polymerization

The catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

In an alternate embodiment, the diluent or solvent may be comprise fluorinated hydrocarbons. Fluorinated hydrocarbons are defined to be compounds consisting essentially of at least one carbon atom and at least one fluorine atom, and optionally at least one hydrogen atom. A perfluorinated carbon is a compound consisting essentially of carbon atom and fluorine atom, and includes for example linear branched or cyclic, $C_1$ to $C_{40}$ perfluoroalkanes, preferably $C_{11}$ to $C_{40}$ perfluoroalkanes. In one embodiment, the fluorinated hydrocarbons are represented by the formula:

$$C_xH_yF_z$$

wherein x is an integer from 1 to 40, preferably from 1 to 30, more preferably from 1 to 20, even more preferably from 1 to 10, and still even more preferably from 1 to 6, alternatively x is an integer from 2 to 20, preferably from 3 to 10, more preferably from 3 to 6, and most preferably from 1 to 3, and wherein y is greater than or equal 0 and z is an integer and at least one, more preferably, y and z are integers and at least one.

In one embodiment, a mixture of fluorinated hydrocarbons are used as the solvent or diluent in the process of the invention, preferably a mixture of a perfluorinated carbon and a fluorinated hydrocarbon, and more preferably a mixture of fluorinated hydrocarbons. In yet another embodiment, the fluorinated hydrocarbon is balanced or unbalanced in the number of fluorine atoms in the fluorinated hydrocarbon compound. Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorinated hydrocarbons include difluoromethane, trifluoromethane, 1,1-difluoroethane, 1,1,1-trifluoroethane, fluoromethane, and 1,1,1,2-tetrafluoroethane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included.

Polymer Products

The polymers produced herein include homopolymer and copolymers of ethylene and or propylene with optional other monomers.

In a preferred embodiment the polymer produced comprises at least 50 weight % propylene, preferably at least 60% propylene, alternatively at least 70% propylene, alternatively at least 80% propylene.

In another preferred embodiment the polymer produced comprises at least 50 weight % ethylene, preferably at least 60% ethylene, alternatively at least 70% ethylene, alternatively at least 80% ethylene.

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene and polypropylene copolymers.

The polymers produced, typically ethylene based polymers, generally have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

Polymers produced by the process of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

Toluene, tetrahydrofuran, fluorobenzene, diphenyl amine, and potassium hydride were purchased from Aldrich Chemical Company. Chromium trichloride was purchased from Strem. Grace Davison 948 silica was obtained from Grace Davison.

Synthesis of Supported Catalyst

1. K(THF)nN($C_6H_5$)$_2$
    30.0 grams of diphenylamine was dissolved into 300 mls of tetrahydrofuran. The solution was cooled to −35° C. 7.14 grams of potassium hydride was added via spatula in small portions over a period of several hours. After gas evolution ceased the solvent was removed, and the resulting solid was dried under vacuum overnight.

2. Cr(N($C_6H_5$)$_2$)$_3$
    10.03 grams of K(THF)nN($C_6H_5$)$_2$ was dissolved into tetrahydrofuran (120 mls). The solution was cooled to −35° C. 1.91 grams of chromium trichloride was added to the reaction vessel. The resulting slurry was allowed to stir overnight at room temperature. The solvent was removed under vacuum. Approximately 150 mls of fluorobenzene was added to the solids and stirred for 30 minutes. The slurry was filtered and the dark almost black filtrate was dried under vacuum yielding 7 grams of black crystals. A single crystal X-ray diffraction study by (Ged Parkin, Dept. Chemistry Columbia University) revealed a trigonal planar Cr(III) species with Cr—N bond lengths determined Cr—N(1)=1.863(1), Cr—N(2)=1.856(3), Cr—N(3)=1.855(2) angstroms, see FIG. 1.

3. Supported Catalyst 1
    30 grams of Grace-Davison 948 silica (calcined previously at 600° C.) was slurried into 250 mls of toluene. 6.4 grams of Cr(N($C_6H_5$)$_2$)$_3$ was added to the slurry and the reaction is was heated to 100° C. overnight. After letting the reaction cool to room temperature, the slurry was filtered, rinsed with several 50 ml portions of toluene, and dried under vacuum yielding a free flowing black powder, 34 grams. The toluene filtrate was evaporated to dryness yielding 2.65 grams of solids containing diphenyl amine and some reactant.

4. Comparative Supported Catalyst 2
    2.00 grams of Grace-Davison 948 silica (calcined previously at 600° C.) was slurried into 250 mls of toluene. 0.69 grams of Cr(N(SiMe$_3$)$_2$)$_3$ (Cr(N(SiMe$_3$)$_2$)$_3$ way synthesized as described in J. Chem. Soc. (A), 1433 (1971.) was added to the slurry and the reaction was allowed to sit several hours. The slurry was filtered, rinsed with several 50 ml portions of toluene, and dried under vacuum yielding a free flowing green powder.

5. Supported Catalyst 3
    2.0 grams of supported catalyst 1 was slurried into 20 mls of toluene with 0.48 grams of perfluorophenol. The slurry was allowed to sit at room temperature overnight, after which the slurry was filtered rinsed with several 10 ml portions of toluene and dried under vacuum yielding a free flowing green powder (2.2 grams).

Polymerizations Using Supported Catalysts

Experimental—Polymerizations:

In the following slurry phase experiments pressure is reported in atmospheres and pounds per square inch. The conversion factors to S.I. Units are; 1 psi equals 6.894757 kPa and 1 atm equals 101.325 kPa.

Feed and Co-Monomer

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. 98+ % 1-hexene was obtained from Alfa-Aesar and further purified by filtration through basic alumina (Aldrich Chemical Company, Brockman Basic 1) into a vessel containing activated 3A molecular sieve.

Activator

Tri-n-octyl aluminum (TNOAL) was obtained from Akzo Chemicals, Inc. and used without further purification.

Polymerization grade hexane was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-hexene Copolymerization: The reactor was prepared as described above, and then purged with ethylene. The reactors were heated to 40° C. and ethylene was first charged to the reactor.

A solution of 1-hexene and scavenger/co-catalyst at room temperature and pressure was next added to the reactors via syringe. The reactors were then brought to process temperature (85° C.) while stirring at 400 RPM. Once at process temperature, ethylene delivery pressure for polymerization was set to the pressure generated by the components (ethylene, diluent, co-monomer, scavenger/co-catalyst) in the reactor.

Supported catalysts were stirred in toluene at ambient temperature and pressure and added to the reactors (at process temperature and pressure) via syringe as a slurry to initiate polymerization.

In the nature that solutions are added via syringe, a hexanes solution was also injected via the same syringe following their addition to insure that minimal solution was remaining in the syringe. This procedure was applied after the addition of the 1-hexene/activator solution as well as the catalyst slurry.

Ethylene was allowed to enter (through the use of computer controlled solenoid valves) the autoclaves during polymerization to maintain reactor gauge pressure (±2 psig). Reactor temperature was monitored and typically maintained within ±1° C. Polymerizations were halted by addition of approximately 400 psig O$_2$/Ar (5 mole % O$_2$) gas mixture to the autoclaves for approximately 30 seconds. The polymerizations were quenched after a predetermined cumulative amount of ethylene had been added or for a maximum of 45 minutes polymerization time. The reactors were cooled and vented. The polymer was isolated after the remaining reaction components were removed in-vacuo. Yields reported include total weight of polymer and residual catalyst. Yields are listed in Table 1.

Polymer Characterizations

GPC Method "C"—Gel Permeation Chromatography—Alliance 2000 DRI Only

This method used a Waters Alliance 2000 gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 1.0 mL/min. Three (Polymer Laboratories) PLgel Mixed-B columns were used. This technique is discussed in "*Macromolecules*, Vol. 34, No. 19, pp. 6812-6820" which is incorporated herein by reference.

The separation efficiency of the column set was calibrated using a series of narrow molecular weight distribution polystyrene standards, which reflects the expected molecular weight range for samples and the exclusion limits of the column set. At least 10 individual polystyrene standards, ranging from Mp ~580 to 10,000,000, were used to generate the calibration curve. The polystyrene standards were obtained from Polymer Laboratories (Amherst, Mass.) or an equivalent source. To assure internal consistency, the flow rate was corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (logMp vs. retention volume) was generated by recording the retention volume at the peak in the DRI signal for each PS standard, and fitting this data set to a $2_{nd}$-order polynomial. Polystyrene standards were graphed using Viscotec 3.0 software. Samples were analyzed using WaveMetrics, Inc. IGOR Pro and Viscotec 3.0 software using updated calibration constants.

TABLE 1

Polymerization Data

| Catalyst Chemical | Temp/Min | Mn | Mw | Mz | Mw/Mn | Mz/Mw | Yield grams PE |
|---|---|---|---|---|---|---|---|
| Catalyst 1 0.3 mgs | 85° C./45 | 3,812 | 379,554 | 2,875,590 | 99.55 | 7.58 | .1158 .1155 .1173 |
| Comparative Catalyst 2 0.3 mgs | 85° C./45 | | | | | | .0298 .0286 .0297 |
| Catalyst 3 0.3 mgs | 85° C./45 | 7,505 | 779,321 | 3,001,818 | 103.83 | 3.85 | .1179 .1122 .1125 |

1.5 mgs of tri-n-octylaluminum in 22.5 ml reactor

As can be noted from Table 1, ligand selection can have a significant effect on catalyst activity.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A catalyst compound of the formula:

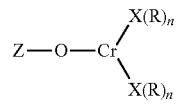

where
- Z—O is a support material, where O is oxygen and Z is Si, Ti, Al, Sn, Fe, Ga, Zr, B, Mg or Cr;
- each X is, independently, nitrogen, oxygen, phosphorus, or sulfur;
- each n is, independently, 1 or 2;
- each R is, independently, an aryl group, or a substituted aryl group, where alumoxane is not present.

2. The catalyst compound of claim 1 wherein each X is N.

3. The catalyst compound of claim 1 wherein each R is, independently, an aryl group.

4. The catalyst compound of claim 1 wherein each R is, independently, a phenyl group or a substituted phenyl group.

5. The catalyst compound of claim 1 wherein each R is, independently, phenyl, substituted phenyl, naphthyl, substituted naphthyl, biphenyl, substituted biphenyl, diphenylether, substituted diphenylether, tolyl, substituted tolyl, benzophenone or substituted benzophenone.

6. The catalyst compound of claim 1 wherein each R is, independently, phenyl, substituted phenyl, naphthyl, or substituted naphthyl.

7. The catalyst compound of claim 1 wherein each R is phenyl.

8. A composition comprising an aluminum alkyl and a catalyst compound of the formula:

$$Z-O-Cr\begin{matrix}X(R)_n\\X(R)_n\end{matrix}$$

where
- Z—O is a support material, where O is oxygen and Z is Si, Ti, Al, Sn, Fe, Ga, Zr, B, Mg or Cr;
- each X is, independently, nitrogen, oxygen, phosphorus, or sulfur;
- each n is, independently, 1 or 2;
- each R is, independently, an aryl group, or a substituted aryl group where alumoxane is not present in the composition.

9. The composition of claim 8 wherein the aluminum alkyl is of the formula $Al(R'')_3$, where each R'' is, independently, a C1 to C30 alkyl group.

10. The composition of claim 9 wherein each R'' is, independently, selected from the group consisting of methyl, ethyl, propyl, butyl, pentyl, hexyl, octyl, nonyl, decyl, undecyl, and dodecyl.

11. The composition of claim 9 wherein the aluminum alkyl is of the formula $Al(R'')_3$ and is selected from the group consisting of trimethylaluminum, triethylaluminum, tri-n-butylaluminum, triisobutylaluminum, tri-n-hexylaluminum, and tri-n-octylaluminum.

12. The composition of claim 8 wherein the aluminum alkyl is present at a molar ratio of Al:Cr of 1:10,000 to 10:1.

13. The composition of claim 8 wherein each X is N.

14. The composition of claim 8 wherein each R is, independently, an aryl group or a substituted aryl group.

15. The composition of claim 13 wherein each R is, independently, a phenyl group or a substituted phenyl group.

16. The composition of claim 8 wherein each R is, independently, phenyl, substituted phenyl, naphthyl, substituted naphthyl, biphenyl, substituted biphenyl, diphenylether, substituted diphenylether, tolyl, substituted tolyl, benzophenone or substituted benzophenone.

17. The composition of claim 8 wherein each R is, independently, phenyl, substituted phenyl, naphthyl, or substituted naphthyl.

18. The composition of claim 8 wherein Z is Si, X is N, and each R is, independently, phenyl, substituted phenyl, naphthyl, substituted naphthyl, biphenyl, substituted biphenyl, diphenylether, substituted diphenylether, tolyl, substituted tolyl, benzophenone, or substituted benzophenone.

19. The composition of claim 8 wherein Z is Si, X is N, and each R is, independently, phenyl, substituted phenyl, naphthyl, substituted naphthyl, biphenyl, substituted biphenyl, diphenylether, substituted diphenylether, tolyl, or substituted tolyl;
benzophenone or substituted benzophenone.

20. A process to polymerize monomers comprising contacting monomers with a composition comprising an aluminum alkyl and a catalyst compound of the formula:

$$Z-O-Cr\begin{matrix}X(R)_n\\X(R)_n\end{matrix}$$

where
- Z—O is a support material, where O is oxygen and Z is Si, Ti, Al, Sn, Fe, Ga, Zr, B, Mg or Cr;
- each X is, independently, nitrogen, oxygen, phosphorus, or sulfur;
- each n is, independently, 1 or 2;
- each R is, independently, an aryl group, or a substituted aryl group where alumoxane is absent from the composition.

21. The process of claim 20 wherein the monomers are selected from the group consisting of ethylene, propylene, butene-1, pentene-1,4-methyl-pentene-1, hexene-1, octene-1, decene-1,3-methyl-pentene-1, norbornene, norbornadiene, vinyl norbornene, ethylidene norbornene, and 3,5,5-trimethyl-hexene-1.

22. The process of claim 20 where the monomer is ethylene.

23. The process of claim 20 where the monomer is propylene.

24. The process of claim 22 wherein the monomers are further selected from the group consisting of propylene, butene-1,4-methyl-pentene-1,3-methyl-pentene-1, hexene-1 and octene-1.

25. The process of claim 23 wherein the monomers are further selected from the group consisting of ethylene, butene, pentene, hexene, heptene, octene, nonene, decene, dodecene, 4-methyl-pentene-1,3-methyl pentene-1, and 3,5, 5-trimethyl-hexene-1.

26. The process of claim 20 wherein the monomers are further selected from a diene wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, and dicyclopentadiene.

27. The process of claim 26 wherein the diene is present at from 0.00001 to 1.0 weight %, based upon the total weight of the composition.

28. The process of claim 20 wherein the process is a slurry process.

29. The process of claim 20 wherein the process is a gas phase process.

30. The process of claim 20 wherein the process is a bulk phase process.

31. The process of claim 20 wherein alumoxane is present at 10 ppm or less.

32. The process of claim 20 wherein the aluminum alkyl is of the formula $Al(R'')_3$, where each R'' is, independently, a $C_1$ to $C_{30}$ alkyl group.

33. The process of claim 32 wherein each R'' is, independently, selected from the group consisting of methyl, ethyl, propyl, butyl, pentyl, hexyl, octyl, nonyl, decyl, undecyl, dodecyl.

34. The process of claim 32 wherein the aluminum alkyl of the formula $Al(R'')_3$ is selected from the group consisting of trimethylaluminum, triethylaluminum, tri-n-butylaluminum, triisobutylaluminum, tri-n-hexylaluminum, and tri-n-octylaluminum.

35. The process of claim 20 wherein the aluminum alkyl is present at a molar ratio of Al:Cr of 1:10,000 to 10:1.

36. The process of claim 20 wherein each X is N.

37. The process of claim 20 each R is, independently, an aryl group or a substituted aryl group.

38. The process of claim 20 wherein each R is, independently, a phenyl group or a substituted phenyl group.

39. The process of claim 20 wherein each R is, independently, phenyl, substituted phenyl, naphthyl, substituted naphthyl, biphenyl, substituted biphenyl, diphenylether, substituted diphenylether, tolyl, substituted tolyl, benzophenone or substituted benzophenone.

40. The process of claim 20 wherein each R is, independently, phenyl, substituted phenyl, naphthyl, or substituted naphthyl.

41. The process of claim 20 wherein each R is, independently, phenyl or substituted phenyl and X is N.

42. The process of claim 20 wherein Z is Si, X is N, and each R is, independently, phenyl, substituted phenyl, naphthyl, substituted naphthyl, biphenyl, substituted biphenyl, diphenylether, substituted diphenylether, tolyl, or substituted tolyl benzophenone, or substituted benzophenone.

43. The process of claim 20 wherein Z is Si, X is N, and each R is, independently, phenyl, substituted phenyl, naphthyl, substituted naphthyl, biphenyl, substituted biphenyl, diphenylether, substituted diphenylether, tolyl, substituted tolyl, benzophenone or substituted benzophenone.

44. A catalyst system comprising an aluminum alkyl and a catalyst compound of the formula:

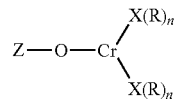

where
Z—O is a support material, where O is oxygen and Z is Si, Ti, Al, Sn, Fe, Ga, Zr, B, Mg or Cr;
each X is, independently, nitrogen, oxygen, phosphorus, or sulfur;
each n is, independently, 1 or 2;
each R is, independently, an aryl group, or a substituted aryl group where alumoxane is not present in the catalyst system.

45. A catalyst system which is the combination of an aluminum alkyl and a catalyst compound of the formula:

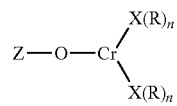

where
Z—O is a support material, where O is oxygen and Z is Si, Ti, Al, Sn, Fe, Ga, Zr, B, Mg or Cr;
each X is, independently, nitrogen, oxygen, phosphorus, or sulfur;
each n is, independently, 1 or 2;
each R is, independently, an aryl group, or a substituted aryl group, where alumoxane is not present in the catalyst system.

* * * * *

UNITED STATES PATENT AND TRADEMARK OFFICE
CERTIFICATE OF CORRECTION

PATENT NO. : 7,648,940 B2
APPLICATION NO. : 11/589499
DATED : January 19, 2010
INVENTOR(S) : Matthew W. Holtcamp and Renuka N. Ganesh It is certified that error appears in the above-identified patent and that said Letters Patent is hereby corrected as shown below:

In claim 42 at Column 20, lines 1-2, please add --.-- after the phrase "substituted tolyl".

In claim 42 at Column 20, line 3, please remove "benzophenone, or substituted benzophenone."

Signed and Sealed this

Seventeenth Day of August, 2010

David J. Kappos
*Director of the United States Patent and Trademark Office*